Feb. 15, 1966 F. H. McINTOSH 3,235,804

RECEIVER FOR LECTURE BROADCASTING SYSTEM

Original Filed Jan. 27, 1959 2 Sheets-Sheet 1

INVENTOR

FRANK H. McINTOSH

BY Hurvitz & Rose

ATTORNEYS

Feb. 15, 1966 F. H. McINTOSH 3,235,804

RECEIVER FOR LECTURE BROADCASTING SYSTEM

Original Filed Jan. 27, 1959 2 Sheets-Sheet 2

INVENTOR
FRANK H. McINTOSH

BY Hurvitz & Rose
ATTORNEYS

United States Patent Office 3,235,804
Patented Feb. 15, 1966

3,235,804
RECEIVER FOR LECTURE BROADCASTING SYSTEM

Frank H. McIntosh, 1906 M St. NW., Washington, D.C.
Original application Jan. 27, 1959, Ser. No. 789,393, now Patent No. 3,078,348, dated Feb. 19, 1963. Divided and this application Nov. 16, 1962, Ser. No. 246,849
6 Claims. (Cl. 325—318)

This application is a division of my application, Serial No. 789,393, filed January 27, 1959, and entitled "Lecture Broadcasting System," now Patent #3,078,348.

The present invention relates generally to systems of short range broadcasting of multiple programs in a restricted area, and to receivers for the broadcast signals.

Briefly describing the invention, a plurality of tape reproducers is employed to provide multiple programs, and all the tapes may have different recorded content. Each reproducer is coupled to a different modulator, the modulators all supplied by the same carrier frequency, deriving from the same source. Thereby, the phases of the transmitted carriers are phase locked at zero frequency difference. Each transmitter broadcasts by means of a tuned loop, in a different area. The carrier frequency employed may be in the range 100 kc. and at such power that the signal is broadcast over a short range only.

In one preferred mode of producing the invention, it is desired to broadcast different programs into separate rooms of the same building. In such case the antennas employed may be constituted of loops extending about the boundaries of the room at floor level. Signal may then be received anywhere within the room, at relatively high level, but the level of any signal in an adjacent room is quite low, and does not present an interference program.

On the other hand, for some applications the loops may subsist in vertical planes, and be located all in a single room, auditorium or the like.

The loop antennas may be tuned, preferably by means of a variable series capacitor. By reason of the frequency employed, and the tuning of the loops, broadcasting over the desired range may be accomplished with relatively small power and by means of relatively inexpensive equipment. Moreover, slight detuning of the antenna affords a device for controlling radiated power simply and effectively.

The receivers of the system are arranged to be self-powered, either by a single small dry cell, or in response to received signal. So, for example, a diode or transistor detector may be employed, which derives carrier signal from an antenna comprising a short ferrite rod employed as a core for the coil of a tuned circuit. Other forms of antenna, as simple loops, may also be employed. The detector supplies its output to a single earpiece, of the type common in hearing aids, which may be conveniently hung from an ear. The receiver, exclusive of earpiece may be carried as convenient, about clothing, or the like.

As a further modification of the receiver of the system, resort may be had to a hollow wand-like structure, within which is contained the receiver antenna and receiver of the system. The longitudinal axis of the receiver antenna coincides with the longitudinal axis of the wand-like structure, so that the receiver is receptive only of a transmitting loop toward which it is pointed. A small acoustic transducer may be secured to one end of the wand-like structure, so that the transducer may be held to the ear while the structure is being pointed.

In accordance with still another embodiment of the invention the acoustic transducer, sometimes called ear piece, may be mounted in a disposable support, for hygienic reasons. The support is so constructed as to isolate the ear from the surrounding space, so that ambient noise at the ear is reduced, and so that the ear piece need not contact the ear to provide a suitable level of acoustic output.

The receiver circuitry may take a variety of forms, but certain basic problems must be met. One problem is that of receiver battery drain, since it cannot be assumed that users of the receivers will be diligent in switching off the receivers when no programs are being received. According to the invention the receiver circuitry is arranged to operate at very small battery drain in absence of signal, and to drain the battery only in response to signal. Receivers may be stored indefinitely, by virtue of this property, without substantial concern for battery life, the latter having life approximately equal to shelf life when in intermittent use on a low drain load.

An additional feature required of the receiver is that it not overload, and distort in the presence of strong signals. In the practice of the present invention large ranges of signal strength are encountered, depending on proximity of the receiver to a transmitting antenna. Use of AVC in simple transistor receivers proves impractical, because of cost considerations and because of the difficulty of designing appropriate circuitry. According to the present invention the receiver operates always at full sensitivity, but provision is made for preventing overload on strong signals.

It is, accordingly, a broad object of the invention to provide a novel system of short range broadcasting of multiple programs, without mutual interference.

It is another object of the invention to broadcast different programs to separate rooms or portions of the same building, all on the same frepuency, and to provide personal receivers for receiving at each room or portion of a building only the program appropriate thereto.

It is a further object of the invention to provide a very light, economically constructed personal radio receiver, having zero battery drain in no signal condition.

Another object of the invention is to avoid undesirable beats and other objectionable effects from multiple carriers by utilizing the same carrier source for the activation of all transmitters. This case uses a quartz crystal piezoelectric oscillator for frequency stability. This is a major factor in permitting close proximity of adjacent loops and minimizing undesirable effects.

It is still another object of the invention to provide a hollow wand-like receptacle having an included rod antenna, the wand being capable of carriage by the hand, so that when directed to any one of a plurality of transmitting antennas, it enables selection of transmissions from that one to the exclusion of the others. It is also an object of the invention to provide an ear piece secured to the wand receiver, whereby the ear piece may be held to the ear while the wand is being pointed.

Still a further object of the invention resides in the provision of a hygienic support, for a small acoustic transducer or ear piece, which may be discarded after use, and which provides certain acoustic advantages in respect to isolation of the ear from ambient noise, and of concentration at the ear of the acoustic output of the ear piece.

It is another object of the invention to provide a transistorized battery operated radio receiver which operates at full sensitivity at all times, but is protected against the overload effect of high intensity signals without requiring AVC circuits.

The above and still further objects, features and advantages of the present invention will become apparent upon consideration of the following detailed description of one specific embodiment thereof, especially when taken in conjunction with the accompanying drawings wherein.

Figures 1, 2, 3, 4:
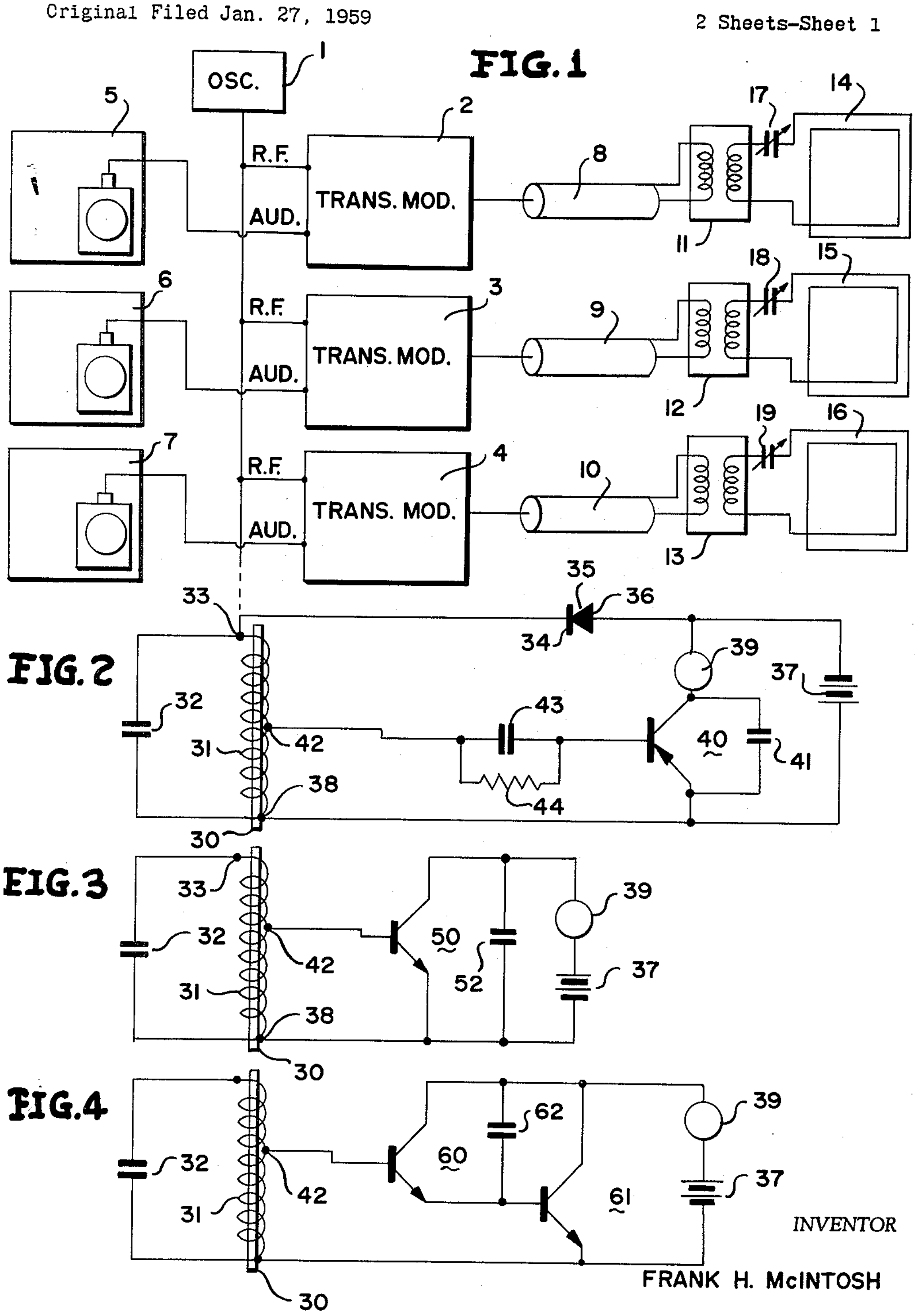
FIGURE 1 is a block diagram of a transmitter, according to the present invention.
FIGURE 2 is a schematic circuit diagram of a receiver according to the present invention.
FIGURES 3 and 4 are schematic circuit diagrams of modifications of the receiver of FIGURE 2.

Referring more particularly to the accompanying drawings, the reference numeral 1 denotes an oscillator, which may preferably be crystal controlled, and have a frequency of 100 kc. The specific frequency specified is exemplary only, and other values may be employed provided they are values which do not give rise to radiation fields at considerable distances. To this end values below 100 kc. are preferred to those above.

The oscillator 1 is coupled to a plurality of three transmitter modulators 2, 3, 4 all in parallel. Clearly, any desired number of modulators may be employed, and three are illustrated for purpose of exemplification only. Modulating signals are supplied to the modulators 2, 3, 4, each from a separate magnetic tape reproducer, these being identified by the reference numerals 5, 6, 7, respectively. Each magnetic tape, in general, contains different recorded information, and the reproducers are arranged to repeat the messages indefinitely, or until reproduction is willfully terminated. The modulators 2, 3, 4, respectively, supply modulated carrier to separate transmission lines 8, 9, 10, which in turn drive impedance matching transformers 11, 12, 13. The latter drive series tuned loops 14, 15, 16, which are tuned by variable condensers 71, 18, 19 to resonance for maximum radiated output and to an off resonant condition when reduced output is desired.

The loops 14, 15, 16 may be all in the same plane, which may be horizontal, for some applications. For example, each separate loop may be located about the boundaries of a different room at floor level, so that different information may be broadcast into the separate rooms. On the other hand, the loops may be vertical, and need not be in the same plane, if sufficiently separated. In general, the placement of the loops is a matter of engineering judgments, the end to be accomplished being to render feasible deriving signals from the loops selectively, when the loops are in relative proximity.

By reason of the frequency employed, the character of the transmitting loop and the range at which reception takes place, the transmitted energy from any loop is in the form of a radio frequency magnetic field capable of inducing a voltage in a receiving loop whose axis is in a direction parallel to the axis of the transmitting loop.

The receiver of the system, as exemplified in FIGURE 2 of the drawings, comprises preferably a ferrite rod 30 about which is wound a coil of wire 31. The latter is tuned, by means of a parallel condenser 32, to the transmission frequency. One end 33 of the coil 31 is connected to the cathode 34 of a diode 35 (type 1N34A) the anode 36 of which is connnected to the negative pole of a battery 37.

The positive pole of the battery 37 is connected to the other end 38 of the coil 31. Connected across the battery 37 is an electro-acoustic transducer 39 in the form of a small ear piece, in series with the collector to emitter path of a PNP transistor 40 (type 2N34). The latter is shunted for radio frequencies by a .01 condenser 41.

A tap 42 is taken on coil 31 about two-thirds of the distance from end 33 of coil 31, tap 42 being connected to the base of the transistor 40 via a parallel condenser 43 and resistance 44, of about .02 $\mu$f. and 47K, respectively.

In operation detection takes place in the transistor 40 input circuit by diode action between base and emitter. The transistor 40 then amplifies the detected signal and excites the transducer 39. Diode 35 functions as a radio frequency clamp to limit the voltage developed across inductance 31, when operating in strong fields, and accordingly improves overload characteristics. The base and emitter of transistor 40, being at the same potential, has the transmitter off for zero signal condition resulting in nearly zero battery drain.

Since the receivers of the present invention may be on for long periods of time, whether or not signals are available, it is essential to provide a receiver which need not be turned on and off, i.e. which is at all time ready to receive, but has no current drain in the absence of signals, The exemplary embodiments of the invention illustrated in FIGURES 2 to 4 of the accompanying drawings accomplish this objective.

In accordance with a modification of the system of FIGURE 3 the tap 42 of the coil 31 is connected directly to the base of an NPN transistor 50, the emitter being connected to the end 38 of the coil 31. A battery 37 is connected in series with an electro-acoustic transducer 39, between emitter and collector of transistor 50, and an R.F. by-pass condenser 52 is connected between collector and emitter of the transistor 50.

The absence of bias between base and emitter of transistor 50, these being at the same D.C. potential, enables the transistor 50 to operate in cut-off condition in the absence of signal. In the presence of signal the transistor operates as a detector and amplifier, in that half cycles of signal of one polarity only cause flow of collector current.

In the system of FIGURE 4 the tap 42 of coil 31 is connected to the base of a first NPN transistor 60, the emitter of which is directly connected to the base of a further NPN transistor 61, the emitter of the latter being connected directly to the end point 38 of the coil 31. The collectors of the transistors 60 and 61 are directly interconnected, and battery 37 is connected in series with electro-acoustic reproducer 39 betwen the collectors of transistors 60 and 61 and the emitter of transistor 61. An A.F. condenser 62 is connected between the collector and base of the transistor 61.

Since the base of transistor 60 is connected through the base emitter circuit of transistor 61 to the emitter, for D.C., the transistor 60 is normally essentially cut-off, and draws no current in the absence of signal. The transistor 60 being cut-off, the base of the transistor 61 is floating, and assumes the potential of the emitter of transistor 61, so that it is also cut-off. The receiver, accordingly, draws essentially no current in the absence of signal.

In the presence of signal, the transistor 60 passes half cycles of one polarity of the received signal, causing flow of current to the base of transistor 61. The latter amplifies the signals applied to its base, effecting flow of detected current in the electro-acoustic transducer 39.

It is to be particularly noted that the receiver systems of FIGURES 3 and 4 contain a minimum number of circuit elements, i.e. no bias or load resistances and no condensers except for the optional condenser 62. The cost of fabricating the unit is minimum, and its freedom from maintenance difficulties is increased, by virtue of the simplicity of design. Moreover, it has been found that the efficiency of the system is great, i.e., it operates on minimum battery voltage (1.4 v.) with little or no drain in absence of signal and minimum drain in the presence of signal, and its noise factor is excellent.

Figures 5, 6, 7, 8:
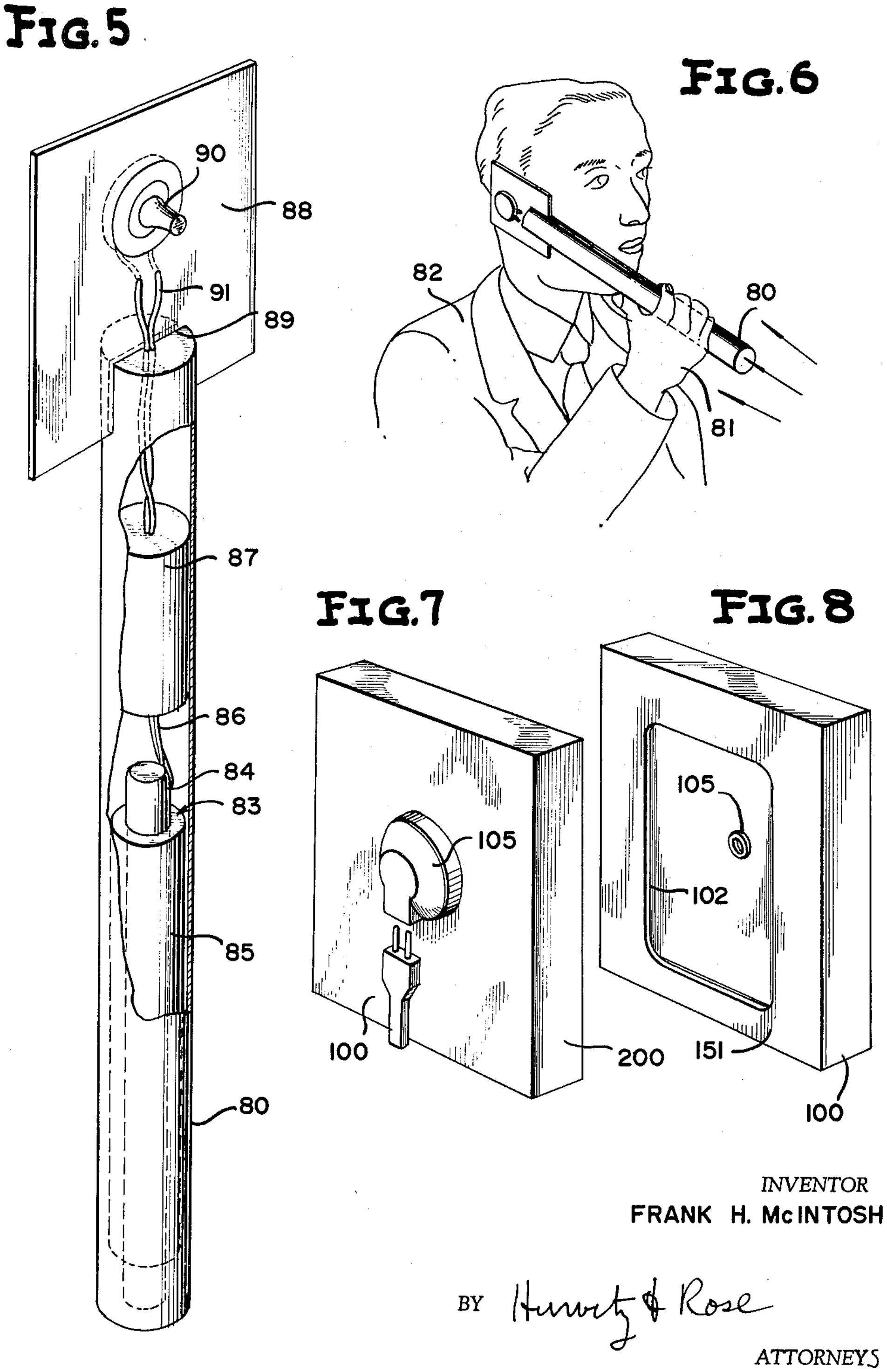
FIGURE 5 is a view in perspective of an electro-acoustic transducer and a support therefor.
FIGURE 6 is a view in perspective of a wand-like receiver, according to the invention.
FIGURE 7 is a view in perspective taken rearwardly, of an electro-acoustic transducer in the form of an ear piece, mounted in a device for securing same on the ear
FIGURE 8 is a view of the structure of FIGURE 7, taken in reverse position.

In FIGURES 5 and 6 of the accompanying drawings is illustrated a wand-like structure 80, comprising a hollow container, about 10" long and of cross-section suited in extent and shape to be grasped by the hand 81 of a person 82 desiring to receive selectively one of the broadcasts transmitted by the system of FIGURE 1.

Internally of the wand-like container 80 is a receiving antenna 83, comprising a ferrite rod 84 with a coil 85 wound thereon and a tuning condenser connected thereacross, the coil terminals leading to a receiver 87, such as that of FIGURE 3 or FIGURE 4. Secured to one end of the wand-like structure 80 is a thin wafer 88 made of heavy cardboard, plastic material or the like, and perhaps $\frac{1}{16}''$ thick. The wafer 88 is partially inserted in an endwise slot 89 in the wand-like container 80 and is locked in said slot, in any convenient fashion, so as to be immovable.

Secured to the wafer 88 is a small acoustic transducer 90 of the type commonly employed in hearing aids. Preferably, the transducer 90 may be secured in a suitably shaped aperture 91 in the wafer 90 and locked therein in any convenient fashion. The transducer 90 is connected to the output of receiver 87 via leads 91.

In operation, the wand-like container 80 may be pointed at any one of the transmitting antennas of FIGURE 1, in order selectively to receive signals from that antenna to the exclusion of the others. The wand-like structure 80 may be pointed while the transducer 90 is held to the ear, so that by turning the body orientation of the wand may be modified without removing the transducer from the ear.

In practical utilization of the present system, each of the antennas 14, 15, 16 may be secreted behind an exhibit in an industrial convention containing many such exhibits, with the axis of each antenna pointing toward persons standing before an exhibit. Such persons may then pass from exhibit to exhibit, at each exhibit may point the wand-like container 80 at the exhibit while facing the exhibit, and while holding the transducer to his ear. Thereby, he may hear the broadcast provided by that exhibitor, alone, before whose exhibit he is standing.

Persons may be subjected to informative broadcasting concerning any given exhibit, in this manner, without disturbing others, and the total manpower required to maintain service at the exhibits may be thus sharply reduced, with considerable saving to the exhibitors.

Since the receivers are non-radiating, as many persons as so desire may listen to any one broadcast, without disturbing others who are likewise listening, and since no wired connections are required between the exhibits and the listeners the latter may assume a variety of positions with respect to the exhibit without losing the broadcast. This is valuable where exhibits are of considerably physical extent, and contain many items. There is, moreover, no objection to having two or more antennas and associated transmitters for a single large exhibit, each being directed to different items or aspects of the exhibit.

In FIGURE 7 and 8 is illustrated a box-like structure 100, fabricated preferably of selectively flexible paper or cardboard so that it may be discarded after one use. The structure 100 includes in one wall 101 a substantially rectangular opening 102, the size of which is adequate to permit slipping over the ear of the normal person, whereupon the lips of the opening 102 extend behind the ear serve to mount securely the box-like structure to the ear.

Extending through a small aperture in that wall 103 of box-like structure 100, which lies opposite to wall 101, is a small hearing-aid type transducer 105.

In operation the structure 100 is supplied to a person desiring to utilize the present system. The latter inserts the transducer 105, and mounts the structure on his ear. The structure 100 is disposable after one use, which is important aesthetically to many users, i.e., it is a hygienic measure. The earpiece 105 is not disposable, but in the practice of the invention need not touch the skin of the user. The structure 100 then operates to isolate the ear substantially from outside disturbances, and at the same time to enhance the sounds provided by the ear piece 105. In net consequence, the sounds emanating from the ear piece 105 are as clear and loud as they would be if the earpiece were actually inserted in the ear.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A transistorized receiver comprising a ferrite rod, an R.F. antenna coil encompassing said rod, a transistor having a base, an emitter and a collector, a D.C. path connecting said base to a point of said coil, a D.C. path connecting said emitter to another and different point of said coil, a source of D.C. supply voltage connected between said emitter and said collector, a resistor-condenser circuit connected in series with said base and adapted to provide detected audio signal on rectification of R.F. signal intercepted by said R.F. antenna coil by diode action between said base and said emitter, an R.F. bypass capacitor connected between said emitter and said collector, and a transducer connected in series between said source of D.C. voltage and said collector.

2. The combination according to claim 1 wherein is further provided a diode connected in D.C. blocking relation between said source of D.C. voltage and a further point of said coil, said diode being operative as an R.F. clamp to limit voltage developed across said coil when operating in strong R.F. fields.

3. A transistorized receiver comprising an antenna, said antenna comprising a ferrite rod, an R.F. coil encompassing said rod for intercepting R.F. signal, an R.F. tuning capacitor connected across at least a portion of said coil and tuning said coil to a desired R.F. signal, said coil having negligible D.C. resistance, a detector comprising a transistor having a base, an emitter and a collector, a D.C. circuit connecting said emitter to a point of said coil, a further D.C. circuit connecting said base to another point of said coil separated from said one point, whereby said emitter and base are at the same potential in absence of said R.F. signal, an R.F. bypass capacitor connected between said emitter and said collector, a source of D.C. supply voltage in series with each other between said emitter and said collector, said transistor being designed to draw zero collector current while said base and emitter are at the same potential.

4. A transistorized receiver comprising an antenna, said antenna comprising a ferrite rod, an R.F. coil encompassing said rod for intercepting R.F. signal, an R.F. tuning capacitor connected across at least a portion of said coil and tuning said coil to a desired R.F. signal, a detector comprising a transistor having a base, an emitter and a collector, a D.C. circuit connectijng said emitter to a point of said coil, a further D.C. circuit connecting said base to another point of said coil separated from said one point, an R.F. bypass capacitor connected between said emitter and said collector, a source of D.C. supply voltage, a transducer, means connecting said transducer and said source of D.C. supply voltage in series with each other between said emitter and said collector, and wherein is provided a parallel resistance and capacitor connected between said base and said another point of said coil in the second mentioned D.C. circuit, said parallel resistance and capacitor being arranged and adapted to provide audio signal as rectified R.F. signal between said base and said emitter.

5. The combination according to claim 4 wherein is further provided a blocking diode directly connecting a point of said coil to a point of said source of D.C. supply voltage, said diode being poled to prevent transfer of D.C. supply voltage and serving to limit the voltage developed across said coil when operating in strong fields.

6. A transistorized receiver comprising an antenna, said antenna comprising a ferrite rod, a coil encompassing said rod, a tuning condenser connected across at least a portion of said coil, a transistor having a base, an emitter and a collector, means coupling said emitter and base directly between a first and a second point, respectively, of said coil, via D.C. paths whereby said emitter and base are at the same D.C. potential only in the absence of A.C. signal across said coil, an electro-acoustic transducer, and a source of voltage connected in series with said electro-acoustic transducer directly between the collector and emitter of said transistor, wherein is further provided a condenser having negligible impedance at radio frequency connected directly between the emitter and collector of said transistor, and wherein is further provided a further transistor having a base, an emitter and a collector, a circuit consisting of a D.C. path connecting the emitter of the first mentioned transistor to the base of the further transistor, a circuit consisting of a D.C. path connecting the emitter of said further transistor to said first point of said coil, and means connecting said source of voltage and said electro-acoustic transducer between the collector and emitter of said second transistor.

References Cited by the Examiner

UNITED STATES PATENTS

| | | | |
|---|---|---|---|
| 2,922,032 | 1/1960 | Haas et al. | 325—318 |
| 2,948,742 | 5/1961 | Worcester | 325—492 |
| 2,995,652 | 8/1961 | Towler | 325—318 |

FOREIGN PATENTS

| | | |
|---|---|---|
| 193,430 | 11/1957 | Austria. |

OTHER REFERENCES

"Transistorized Regenerative Receiver," QST, July 1957, pp. 36, 37.

Sullivan, Electronics, January 3, 1958, page 92.

Knight, Wireless World, May 1954, p. 225.

DAVID G. REDINBAUGH, *Primary Examiner.*